US012055901B2

(12) United States Patent
Trotta et al.

(10) Patent No.: US 12,055,901 B2
(45) Date of Patent: Aug. 6, 2024

(54) METHOD FOR FABRICATING DIAMOND-POLISHED APPLIQUES FOR HOROLOGY

(71) Applicant: Nivarox-FAR S.A., Le Locle (CH)

(72) Inventors: Carmelo Trotta, Le Locle (CH); Frederic Haefeli, Tramelan (CH); Roger Juillet, Fontainemelon (CH)

(73) Assignee: Nivarox-FAR S.A., Le Locle (CH)

( * ) Notice: Subject to any disclaimer, the term of this patent is extended or adjusted under 35 U.S.C. 154(b) by 1576 days.

(21) Appl. No.: 16/275,801

(22) Filed: Feb. 14, 2019

(65) Prior Publication Data

US 2019/0278230 A1 Sep. 12, 2019

(30) Foreign Application Priority Data

Mar. 6, 2018 (EP) .................................... 18160212

(51) Int. Cl.
*G04D 3/00* (2006.01)
*B24B 5/50* (2006.01)
(Continued)

(52) U.S. Cl.
CPC ............. *G04D 3/0092* (2013.01); *B24B 5/50* (2013.01); *G04B 19/10* (2013.01); *G04B 19/12* (2013.01); *G04D 3/0272* (2013.01)

(58) Field of Classification Search
CPC ......... Y10T 29/49579; Y10T 29/49583; Y10T 29/49584; G04D 3/0092; G04D 3/0272;
(Continued)

(56) References Cited

U.S. PATENT DOCUMENTS 2,606,418 A * 8/1952 Fluckiger ............. G04B 19/103 63/26
2,761,198 A * 9/1956 Stern .................... G04B 19/103 968/154
(Continued)

FOREIGN PATENT DOCUMENTS

CH 423 635 5/1966
CN 2687721 Y 3/2005
(Continued)

OTHER PUBLICATIONS

Combined Chinese Office Action and Search Report issued Aug. 5, 2020 in Patent Application No. 201910167376.4 (with partial English language translation and English translation of Category of Cited Documents), citing documents AO-AR therein, 16 pages.
(Continued)

*Primary Examiner* — Sarang Afzali
*Assistant Examiner* — Darrell C Ford
(74) *Attorney, Agent, or Firm* — Oblon, McClelland, Maier & Neustadt, L.L.P.

(57) ABSTRACT

An applique for horology includes a visible upper surface and a lower surface for resting on a dial or a structure of a timepiece. The applique also includes at least one foot projecting from the lower surface for attachment to the dial or the structure. To manufacture the applique, in a first operation, a profile or bar is provided in which blanks of the feet and of the lower surface are machined prior to cutting the profile or bar in a second operation. Then, the upper surface is re-machined with at least one final diamond-polishing operation. During the first operation, at least two machining operations are performed in a cross so as to form a blank of each foot with a polygonal contour having facets.

8 Claims, 2 Drawing Sheets

(51) Int. Cl.

| | |
|---|---|
| ***G04B 19/10*** | (2006.01) |
| ***G04B 19/12*** | (2006.01) |
| ***G04D 3/02*** | (2006.01) |

(58) Field of Classification Search
CPC ........ G04D 3/0051; B24B 5/50; G04B 19/10; G04B 19/12; G04B 19/103
USPC .............................. 29/896.3, 896.32, 896.33
See application file for complete search history.

(56) References Cited

U.S. PATENT DOCUMENTS

| | | | | |
|---|---|---|---|---|
| 5,513,153 | A * | 4/1996 | Thorgersen ............ | G04B 19/30 368/227 |
| 6,105,393 | A * | 8/2000 | Takessian .............. | A44C 17/04 63/26 |
| 8,947,983 | B2 * | 2/2015 | Stark ...................... | G04B 19/06 368/232 |
| 10,206,464 | B2 * | 2/2019 | Lauper ................... | G04B 45/00 |
| 2008/0190139 | A1 * | 8/2008 | Sato ..................... | A44C 17/001 63/32 |
| 2009/0183525 | A1 * | 7/2009 | Hasenfeld ............ | A44C 17/001 63/32 |
| 2012/0060557 | A1 * | 3/2012 | van Looveren ...... | A44C 17/001 63/32 |
| 2017/0176944 | A1 * | 6/2017 | Vuille .................. | G04B 19/103 |
| 2017/0261935 | A1 * | 9/2017 | Charbon .............. | G04B 19/103 |
| 2017/0261936 | A1 | 9/2017 | Charbon | |

FOREIGN PATENT DOCUMENTS

| | | | |
|---|---|---|---|
| CN | 1648792 | A | 8/2005 |
| CN | 2872435 | Y | 2/2007 |
| CN | 206748265 | U | 12/2017 |
| EP | 3 220 208 | A1 | 9/2017 |
| EP | 3 220 209 | A1 | 9/2017 |

OTHER PUBLICATIONS

European Search Report issued Sep. 13, 2018 in European Application 18160212.9, filed on Mar. 6, 2018 (with English translation of categories of Cited Documents and Written Opinion).

* cited by examiner

METHOD FOR FABRICATING DIAMOND-POLISHED APPLIQUES FOR HOROLOGY

CROSS-REFERENCE TO RELATED APPLICATION

This application claims priority to European Patent Application No. 18160212.9 filed on Mar. 6, 2018, the entire disclosure of which is hereby incorporated herein by reference.

FIELD OF THE INVENTION

The invention concerns a method for fabricating an applique for horology, comprising an upper surface intended to be seen by a user, and a lower surface for resting on a dial or a structure of a timepiece, and at least one foot projecting from said lower surface, for attachment to such a dial or such a structure, according to which method in a first operation there is provided a profile or bar in which blanks of said feet and of said lower surface are machined, prior to cutting said profile or said bar in a second operation, and then re-machining said upper surface, with at least one final diamond-polishing operation.

The invention also concerns a timepiece dial including at least one applique made by this method.

The invention also concerns a timepiece including at least one such dial and/or a structure carrying at least one applique made by the method.

The invention concerns the field of external timepiece parts and display functions.

BACKGROUND OF THE INVENTION

Timepiece appliques are essential elements of a timepiece, in particular of a watch, helping to give it a specific look. Consequently, they must be very carefully made, very reproducible and free from any surface finish defects. Perfect workmanship is made difficult by the very small size of these esthetical components and by the difficulty in gripping them. Consequently, the scrap rate may be high. Fabrication is even more complex when the appliques are bent or warped to adapt to the curve of a dial, a flange, or a plate, and have no flat reference surface.

Placing appliques on a support, such as a dial or similar, also requires particular precautions to ensure perfect angular orientation, since any orientation fault, even minimal, is immediately visible. Precise manufacture of the feet is therefore vital.

European Patent No 3220208 in the name of NIVAROX-_FAR SA discloses an economical method for fabricating a timepiece display or hand component, according to which there is chosen, for making each outer visible surface, a coating material, such as an amorphous metal alloy or nanocrystalline structure alloy or an alloy of gold and/or silver and/or copper and/or rhodium and/or titanium and/or aluminium, a first tool is used to make a thick, hollow blank, of a thickness of more than 20 micrometers, from the coating material, with an excess thickness relative to each outer visible surface, with a first cavity for receiving a frame, an interior material is chosen for making a frame, the frame is made and joined to this first cavity, and at least one remaining visible outer visible surface, is diamond tool machined, removing all or part of the excess thickness from the blank.

European Patent No EP3220209 in the name of NIVAROX_FAR SA discloses an economical method for fabricating a timepiece display or hand component according to which a first material that is easy to shape or machine is selected, a bar stock is made from this first material, there is chosen, for making each outer surface of the component, a second material, which is an amorphous metal alloy or nanocrystalline structure alloy or includes nickel or nickel-phosphorus, or which is a pure metal or an alloy of of gold and/or silver and/or copper and/or rhodium and/or titanium and/or aluminium, this bar stock is covered, at least over the surfaces intended to remain visible on the component, with a thick layer having an initial thickness of more than 20 micrometres, of the second material; and at least one outer surface is diamond tool machined, removing all or part of the thick layer.

SUMMARY OF THE INVENTION

The invention proposes to define an applique fabrication method ensuring perfect subsequent positioning of the applique on its support.

The invention also concerns a timepiece dial including at least one applique made by this method.

The invention also concerns a timepiece including at least one such dial and/or a structure carrying at least one applique made by the method.

More particularly, this timepiece is a watch.

BRIEF DESCRIPTION OF THE DRAWINGS

Other features and advantages of the invention will appear from reading the following detailed description, with reference to the annexed drawings, in which.

DETAILED DESCRIPTION OF PREFERRED EMBODIMENTS

Figure 1:
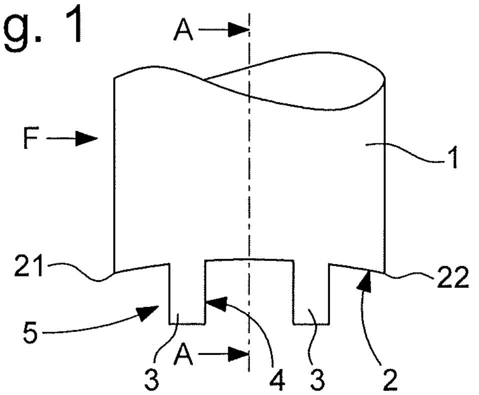
FIG. 1 represents a schematic, side view of a bar at the end of which a first front machining operation is performed.
Figure 2:
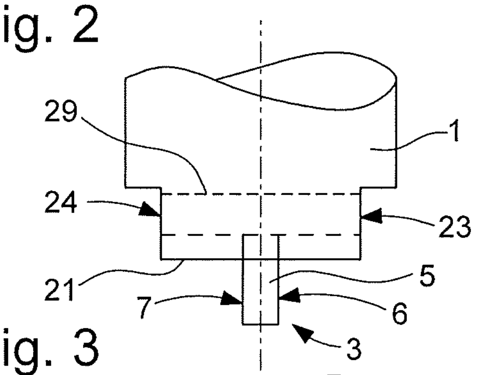
FIG. 2 represents, in a similar manner to FIG. 1, the same bar rotated by 90° about its longitudinal axis, viewed along arrow F of FIG. 1, and on which a second front machining operation is performed, perpendicular to the preceding operation: the dotted line indicates the previously cut area.
Figure 3:
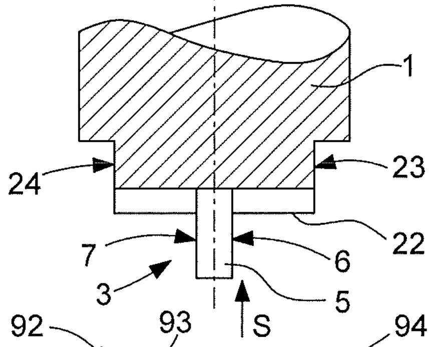
FIG. 3 is a cross-section in the plane of the page of FIG. 2.
Figure 4:
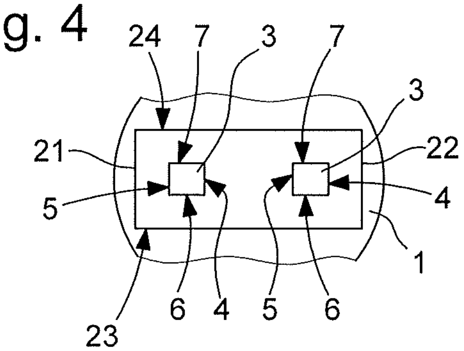
FIG. 4 is an end view of the same bar, along arrow S of FIG. 3, showing two polygonal feet, here with four lateral faces, resulting from the first machining operation and from the second machining operation performed in a cross.
Figure 5:
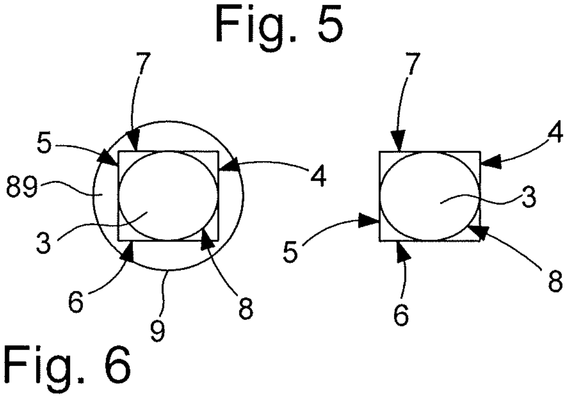
FIG. 5 is an end detail, showing the journaling of the two feet: on the left into the thickness of the face from which the foot protrudes, and on the right to mid-height.
Figure 6:
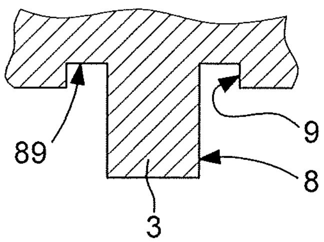
FIG. 6 is a similar cross-section to that of FIG. 3, passing through the left foot of FIG. 5 and showing the rotational clearance around the journaled foot.
Figure 7:
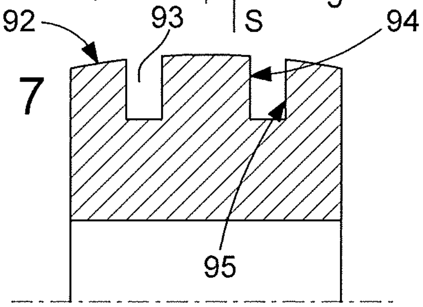
FIG. 7 is a cross-section of a tool used to perform the operation of FIG. 1.
Figure 8:
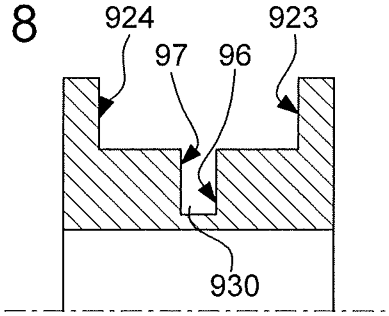
FIG. 8 is a cross-section of a tool used to perform the operation of FIG. 2.
Figure 9:
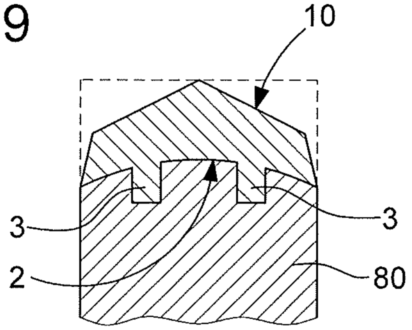
FIG. 9 represents a cross-sectional view of the positioning, after cutting, of the applique blank thus produced, whose lower surface and feet are finished, in a re-machining tool where the blank is held by its feet, and abuts on its lower surface.
Figure 10:
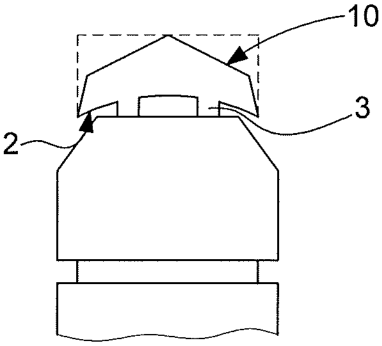
FIG. 10 shows a similar view to FIG. 9 of the blank held in a clamp for re-machining.
Figure 11:
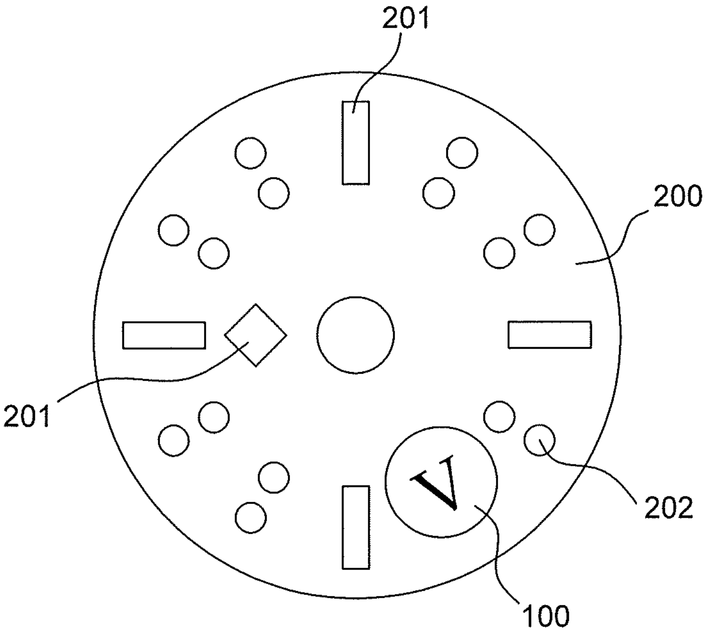
FIG. 11 represents a schematic, front view of a dial comprising various cutouts for receiving circular or quadrangular applique feet, and a figure V applique mounted in position.
Figure 12:
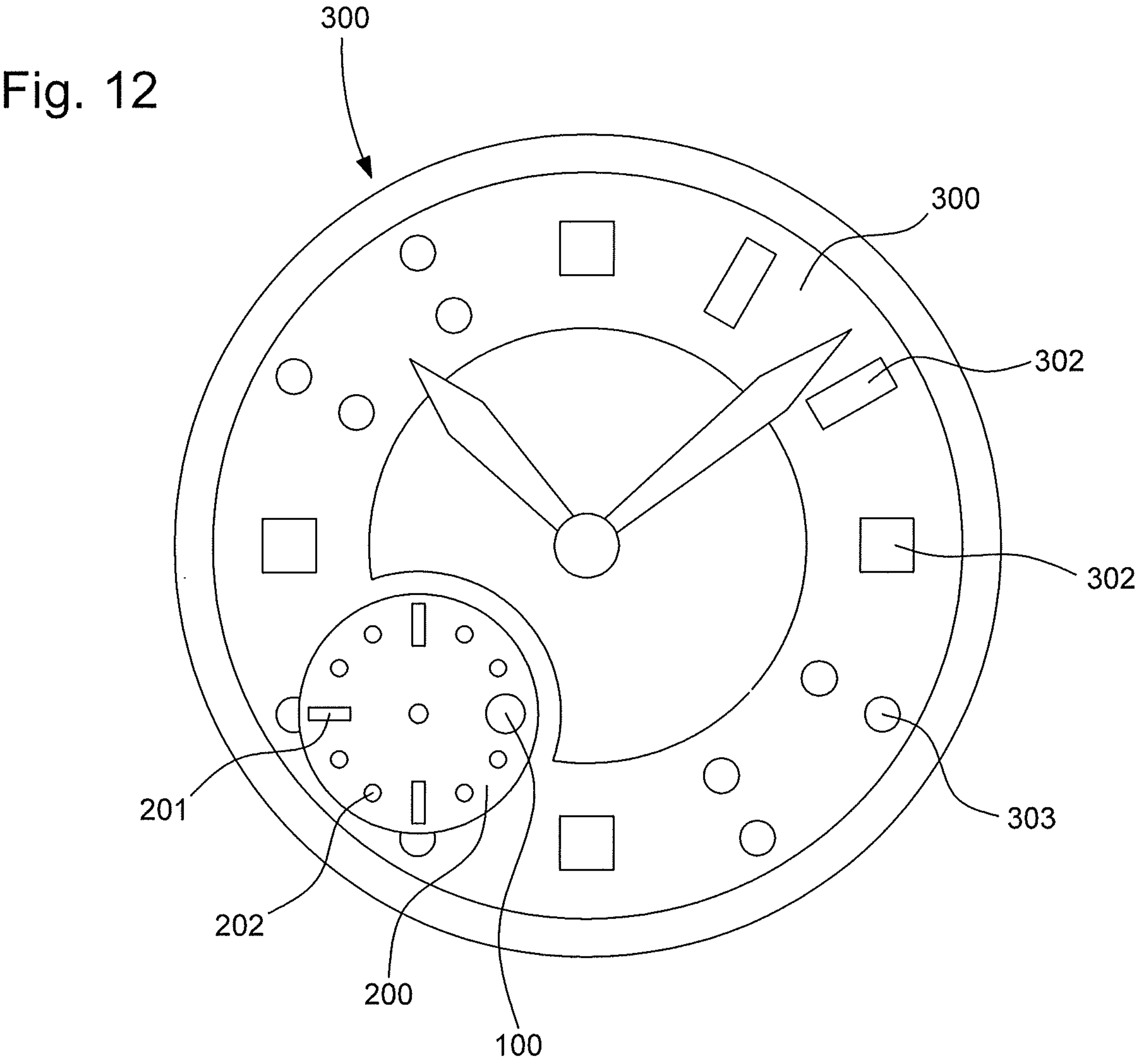
FIG. 12 represents a schematic front view of a watch comprising an annular structure comprising similar cutouts to those of the dial of FIG. 11, and, at seven o'clock, a similar dial to that of FIG. 11.

The invention concerns a method for fabricating a timepiece applique 100.

An 'applique' means any display or decorative element intended to be seen by a user, such as a sign, hour-symbol, numeral, logo, monogram or suchlike, placed on an object, especially a dial, a flange, a plate, a bridge, or suchlike.

Such an applique 100 normally has an upper surface 10 intended to be seen by a user, and a lower surface 2 for resting on a dial or a structure of a timepiece.

If this lower surface 2 can be bonded straight onto such a dial or such a structure it generally has at least one foot 3. Each foot 3 protrudes from this lower surface 2, and more particularly but not exclusively in a particular orientation in space with respect to lower surface 2, in order to be secured to such a dial or such a structure.

The method of the invention includes the following steps:
- in a first operation, providing a profile or a bar 1 in which blanks of feet 3 and of lower surface 2 are machined, prior to cutting this profile or bar 1 in a second operation, and then re-machining upper surface 10 with at least one final diamond polishing operation.

According to the invention, in the first operation, at least two machining operations are performed in a cross so as to produce a blank of each foot 3 with a polygonal contour having facets 4, 5, 6, 7.

More particularly, after creating the polygonal contour and prior to performing the final diamond polishing operation, at least one foot 3, and preferably each foot 3, is journaled, to machine a substantially cylindrical surface 8 that is immediately usable for securing applique 100 to its support in the timepiece.

More particularly still, during the journaling of at least one foot 3 and more particularly of each foot 3, a front slot 89 is formed, which is arranged to receive any burrs or lips when applique 100 is fitted onto a dial or a structure in a press fit or interference fit.

More particularly, this journaling is carried out during the first operation, prior to the cutting operation.

In a particular implementation of the invention, during the first operation, a finishing machining operation is performed on lower surface 2. More particularly, this lower surface 2 is made curved.

Indeed, the advantage of the invention is to obtain feet that are parallel over their entire length, even if lower surface 2 is curved, or, generally, has any shaped profile.

More particularly, this finishing machining operation of lower surface 2 is performed by diamond polishing.

In a particular implementation of the invention illustrated by the Figures, during the first operation, two machining operations are performed in a cross at 90° to each other.

It is understood that the journaling operation makes it possible to obtain feet 3 which are circular, and especially cylindrical, of the normal type. However, forming the blank of feet 3 by cross-machining, in the shape of polygonal feet with facets, also provides an intrinsic orientation surface, for unique and precise angular orientation of the applique 100 comprising such a polygonal foot on its support in a timepiece.

The invention also concerns a method for fabricating a timepiece structure assembly comprising at least one applique 100 including a polygonal contour with facets 4, 5, 6, 7, made by the method described above, and at least one structure 301, which is arranged to receive at least one such applique 100. According to the invention, at least one polygonal opening 302 is made in this structure 301, which is arranged to cooperate with a foot 3 having a polygonal contour with facets 4, 5, 6, 7, to ensure the exact angular orientation of the applique 100 concerned, comprising this foot 3, and/or at least one circular opening 303 is made in this structure 301, which is arranged to receive and clamp, at the junctions between its facets, a foot 3 having a polygonal contour with facets 4, 5, 6, 7, and each foot 3 is pressed into such a polygonal opening 302, or such a circular opening 303.

More particularly, at least one said structure 301 is made in the form of a bare dial 200 arranged to receive at least one such applique 100, and there is made on this bare dial 200 at least one polygonal opening 201 arranged to cooperate with a foot 3 having a polygonal contour with facets 4, 5, 6, 7, to ensure the exact angular orientation of the applique 100 comprising this foot 3 and/or there is made on this bare dial 200 at least one circular opening 202 arranged to receive and clamp, at the junctions between its facets, a foot 3 having a polygonal contour with facets 4, 5, 6, 7.

More particularly, said structure assembly is made with at least one said applique 100 having a single said polygonal foot 3.

Electro-erosion, laser or other machining technologies can nowadays make such non-circular openings, which previously could only be made with drilling tools, and were difficult to form precisely by stamping, especially for supports intended to be enamelled or to be provided with any type of coating.

The invention also concerns a timepiece 300 including at least one such structure 301 bearing at least one applique 100 made by the method according to any of the variants described above, and/or at least one such bare dial 200 bearing at least one such applique 100.

More particularly, this timepiece 300 is a watch.

The invention claimed is:

1. A method for fabricating an applique for horology comprising an upper surface intended to be seen by a user, and a lower surface for resting on a dial or a structure of a timepiece, and at least one foot protruding from said lower surface, for attachment thereof to such a dial or such a structure, the method for fabricating an applique comprising:
- machining, in a first operation, a profile or bar to produce a blank of said at least one foot on said lower surface;
- cutting, after said machining, said profile or said bar in a second operation; and
- then, after said cutting, re-machining said upper surface with at least one final diamond-polishing operation,
- wherein, during said first operation, said machining is performed in a cross so as to form a blank of said at least one foot with a polygonal contour having facets, and
- wherein, after forming said polygonal contour and prior to performing said final diamond polishing operation, said at least one foot is journaled to machine a cylindrical surface that is configured to attach said applique to a support in a timepiece.

2. The method for fabricating an applique for horology according to claim 1, wherein, during the journaling of said at least one foot, there is made a front slot arranged to receive any burrs or lips when said applique is fitted onto said dial or said structure.

3. The method for fabricating an applique for horology according to claim 1, wherein said journaling of said at least one foot is performed prior to said cutting.

4. The method for fabricating an applique for horology according to claim 1, wherein, during said first operation, a finishing machining operation is performed on said lower surface.

5. The method for fabricating an applique for horology according to claim 4, wherein said lower surface is made curved.

6. The method for fabricating an applique for horology according to claim 4, wherein said finishing machining operation on said lower surface is performed by diamond polishing.

7. The method for fabricating an applique for horology according to claim 1, wherein, during said first operation, two machining operations are performed in a cross at 90° to each other.

8. A method for fabricating an applique for horology comprising an upper surface intended to be seen by a user, and a lower surface for resting on a dial or a structure of a timepiece, and at least one foot protruding from said lower surface, for attachment thereof to such a dial or such a structure, the method for fabricating an applique comprising:

machining, in a first operation, a profile or bar to produce a blank of said at least one foot on said lower surface;

cutting, after said machining, said profile or said bar in a second operation; and then, after said cutting, re-machining said upper surface with at least one final diamond-polishing operation, wherein, during said first operation, said machining is performed in a cross so as to form a blank of said at least one foot with a polygonal contour having facets, wherein, during said first operation, a finishing machining operation is performed on said lower surface, and wherein said lower surface is made curved.

* * * * *